United States Patent

Bevens

[15] 3,673,708
[45] July 4, 1972

[54] MULTISENSORY TEACHING APPARATUS

[72] Inventor: Darwin K. Bevens, 394 Blair Avenue, Eugene, Oreg. 97402

[22] Filed: Feb. 18, 1970

[21] Appl. No.: 12,189

[52] U.S. Cl. ................................................. 35/37
[51] Int. Cl. ........................................... G09b 11/04
[58] Field of Search .................. 35/36, 37, 38, 22 R; 273/1 E

[56] References Cited

UNITED STATES PATENTS

| 3,562,927 | 2/1971  | Moskowitz ........................ 35/22 R |
| 2,456,632 | 12/1948 | Greenberg ........................ 35/37   |
| 2,808,263 | 10/1957 | Goldfinger et al ............... 35/22 R X |
| 2,546,666 | 3/1951  | Fleischer ......................... 35/9 R  |
| 2,277,329 | 3/1942  | Kimbrough ....................... 35/37   |

FOREIGN PATENTS OR APPLICATIONS

| 134,821 | 2/1920 | Great Britain ..................... 35/22 R |

Primary Examiner—Wm. H. Grieb
Attorney—James D. Givnan, Jr.

[57] ABSTRACT

An apparatus for the teaching of handwriting skills wherein multisensory signals are fed back to the student to reinforce his learning process. Impairment of one or more of the students senses is overcome by the multisensory feedback by both auditory and visual signals. Grooved conductor plates and a stylus combine to train the students "muscle memory" with interchangeable plates of lessened groove depth being used as writing skill develops. Recorded instructions are provided the student and played upon completion of a circuit by stylus and plate contact.

2 Claims, 11 Drawing Figures

INVENTOR.
DARWIN K. BEVENS
BY James B. [signature]
AGENT

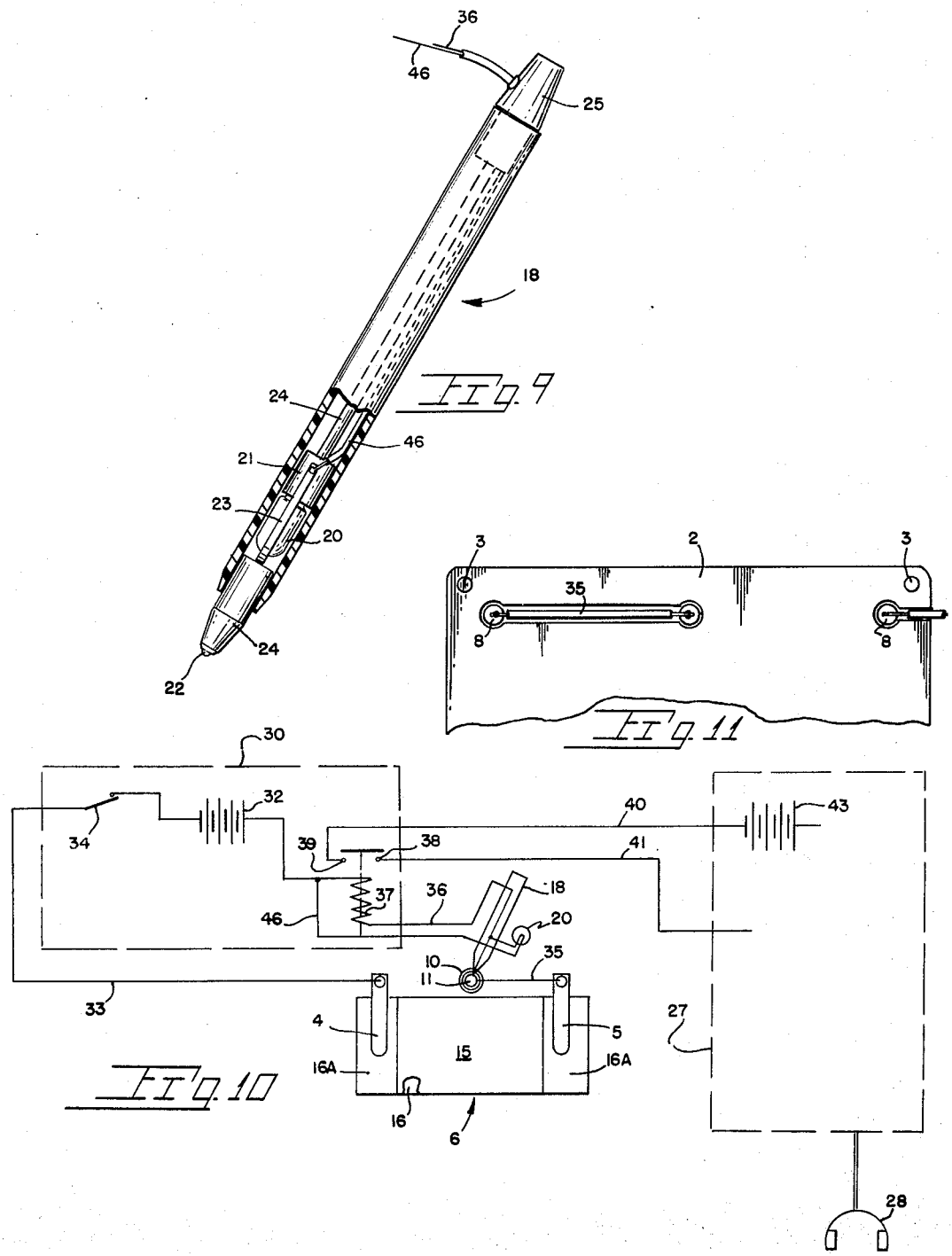

3,673,708

MULTISENSORY TEACHING APPARATUS

BACKGROUND OF THE INVENTION

The present invention relates generally to teaching apparatuses and particularly to such an apparatus for the development of writing skills.

It has long been recognized that tracing, by the student, of letters facilitates the development of muscle control for writing. The accuracy of the students efforts is judged visually by a comparison of the printed letter and his traced efforts to reproduce the letters. Typically the teaching of handwriting to a number of students does not permit the instructor to closely monitor each child's efforts and hence a considerable duration exists between such efforts and confirmation whether or not the efforts are satisfactory. It is well recognized that immediate confirmation of successful writing efforts serves to reinforce the learned muscle response as well as motivate the student further. Additionally, the confirmation of acceptable efforts is most effectively indicated when it is by multisensory signals. The advantages of a multisensory feedback, while applicable in the teaching of unimpaired children, becomes of increased value when the child has a sight, mental or physical impairment. To be effective the confirmation of the efforts of such a child must be prompt and, importantly, by more than one sensory input. Multiple signals are provided to the child by the instant apparatus and may be termed visual, auditory and tactile kinesthetic.

SUMMARY OF THE INVENTION

The present invention is embodied in an apparatus having a conductive stylus used by the student to trace letters, words or numerals formed on a series of interchangeable plates. Circuitry and electrical components indicate in an immediate, multisensory manner the accuracy of the students efforts. Provision is made for varying the tracing effort required of the student by varying the depth of the path along which the stylus is to be guided.

An important object of the present invention is to provide a teaching apparatus requiring a minimum of teacher attention. The present apparatus provides the instant and continuous monitoring of student efforts heretofore only provided when each student was individually instructed. In most teaching situations such supervision is not practical. Without prompt correction undesirable handwriting traits are formed which require additional teaching efforts to correct.

A further object is the provision of an apparatus providing continuous motivation to the student by multisensory signals resulting in his effective concentration and a shortened learning period of basic handwriting skills.

Important also in the present invention is provision for automatic presentation of recorded instructions to the student which instructions are provided at a speed matching the child's progress. This feature is achieved by the stylus acting as a contact of a switch.

The multiple signals indicating the accuracy of the student's efforts are of added importance when the student is handicapped by an impairment or loss of one or more senses. Such is true when the student has a muscular control deficiency. The variable path the stylus follows is such as to cause a tactile kinesthetic feedback to the student when improper writing motions are attempted to develop proper "muscle memory." The variable path is shown in the form of a groove the depth of which is varied on interchangeable conductor plates to require, as the student progresses, more precise muscle control.

BRIEF DESCRIPTION OF THE DRAWING

In the accompanying drawings:

FIG. 9 is an elevational view of the stylus removed from its holder and with fragments broken away for purposes of illustration, FIG. 10 is a wiring schematic, and FIG. 11 is a view of the back of the writing board.

DESCRIPTION OF PREFERRED EMBODIMENTS

Figure 1:
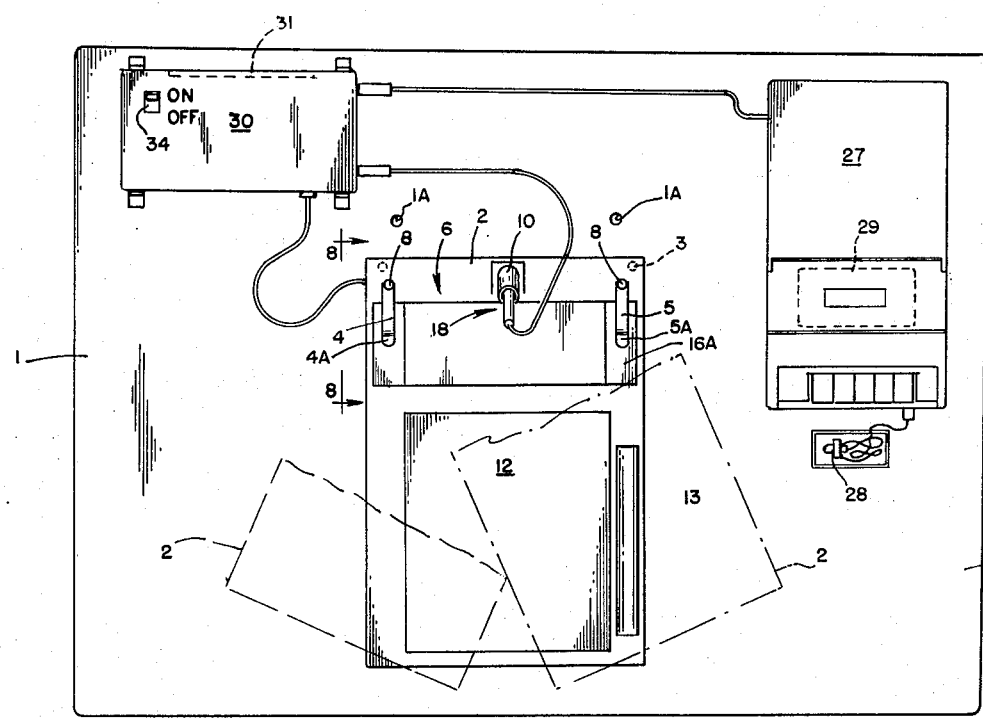
FIG. 1 is a plan view of the instant apparatus.
Figure 2:
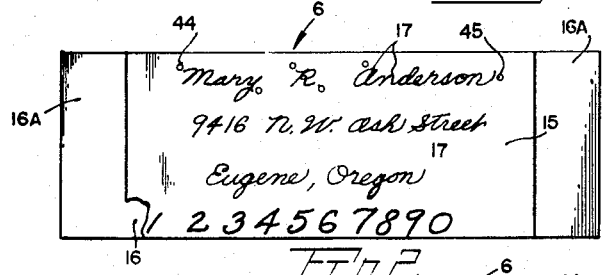
FIG. 2 is a plan view of a typical plate of the present invention.

With continuing reference to the drawings wherein applied reference numerals indicate parts similarly identified in the following specification, the reference numeral 1 indicates a planar shaped base of a size for convenient placement upon a student's desk.

Positionably mounted on the base 1 is a writing board 2 having projections 3 on its underside for placement within recesses 1A in the base. The board is thus positionable (broken and dashed lines) to facilitate writing by either left or right handed students.

Figure 8:
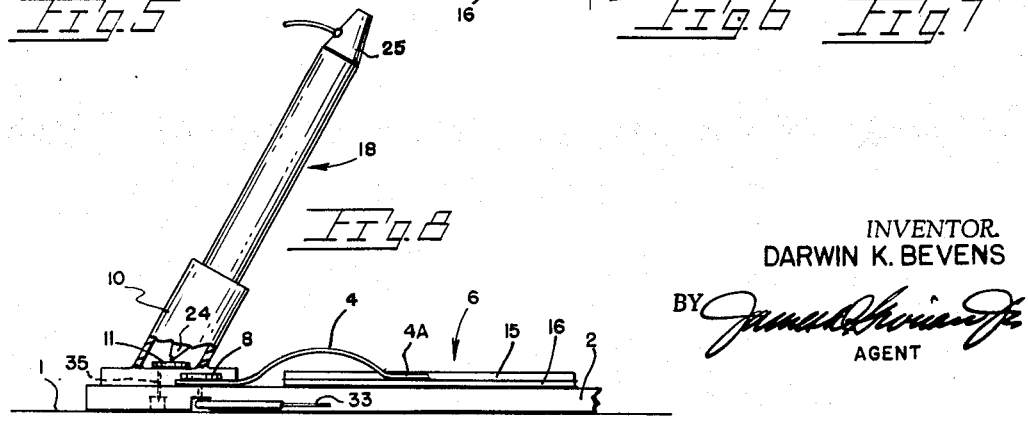
FIG. 8 is a side elevational view of a positionable writing board having a stylus holder and plate clips thereon.

Clips 4 and 5 on the board function to removably mount a conductive plate indicated generally at 6 in an interchangeable manner. The clips are secured by fasteners 8 which extend through the board and thereat are adapted to receive in any suitable manner the ends of a conductor as later described. Each clip has a flattened foot portion at 4A – 5A for downward biased contact with the plate 6 and particularly an exposed metal surface thereof. Fixedly mounted upon the writing board 2 is a stylus holder 10 having a contact 11 (FIG. 8) upon which the later described stylus point rests.

The lower portion of the writing board 2 serves to receive a quantity of practice sheets 12 which, if desired, may be held in place on the board by clips (not shown) or other suitable means. A recessed area 13 serves as a pencil tray.

With particular attention to the plates 6 used in the present invention and best shown in FIGS. 2 through 7, a dielectric coating 15 is superimposed over a metal base 16 with exposed end areas of the metal base at 16A adapted to receive the clip ends 4A – 5A. The dielectric material 15 may be a thermoplastic synthetic resin with insulative properties and further capable of adhering to the metal plate to permit accurate forming of coextensive grooves in both the coating material and metal or alternatively the coating material alone. The depth of the applied coating 15 will vary from plate to plate with the writing grooves formed therein providing different degrees of stylus guidance.

The forming of grooves or voids indicated at 17 may be by a process during the manufacture of the plate or manually by the instructor by means of an engraving tool the latter being the case for plates used in the teaching of writing of individual names, addresses, etc. Further, while cursive handwritten words are shown on both the plates of FIGS. 2 and 5, plates with printed style letters or words are equally advantageous in the teaching of printing to beginning students.

Figures 3, 4:
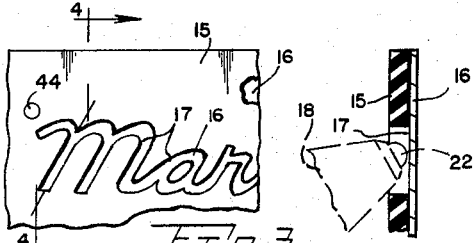
FIG. 3 is an enlarged view of a fragment of the plate of FIG. 2.
FIG. 4 is a sectional view of the fragment of FIG. 3 taken along irregular line 4 — 4 thereof.
Figure 5:
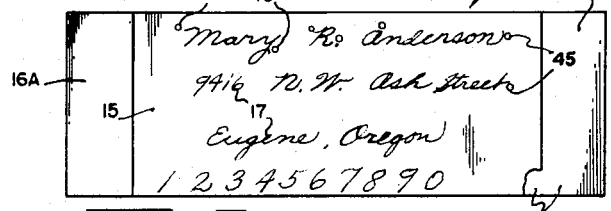
FIG. 5 is a view similar to FIG. 2 showing another form of plate.
Figures 6, 7:
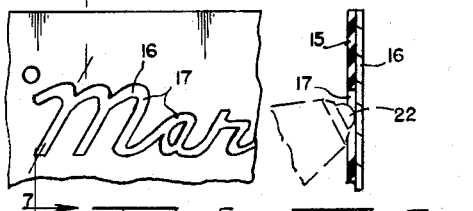
FIG. 6 is an enlarged view of a fragment of the plate of FIG. 5.
FIG. 7 is a sectional view of the fragment of FIG. 6 taken along irregular line 7 — 7 thereof.

FIGS. 4 and 7 illustrate respectively plates having different thicknesses of coatings 15. The plate shown in section in FIG. 4 would be for use by a beginning student while the plate of FIG. 7 would be used in the latter stage of instruction.

The stylus, indicated generally at 18, is best shown in FIG. 9, and includes a miniature light bulb 20 housed along with a light socket 21 within the translucent body 18 of the stylus. The pointed end 24 of the stylus preferably includes a rolling ball element 22 similar to the ball of a ball point writing instrument. In circuit with the ball element 22 is a contact arm 23 which bears against the metallic end of the stylus. For ease of assembly the contact arm 23 is carried by the socket 21 to provide a source for one side of the light 20. Socket 21, its light bulb 20 and the arm 23 are insertable as a unit endwise interiorly of the stylus body by means of an elongate, rigid wire conduit 24 terminating oppositely in an integral cap body 25. The cap body 25 serves to retain the described components in place while allowing their convenient removal for servicing purposes. Routed through the cap and the wire conduit 24 are wires later described in circuit with the light 20 and separately with the stylus ball element 22.

Indicated at 27 in FIG. 1 is a magnetic tape playing device for the playing of recorded instructions to the student, the instructions constituting an aural signal to the student. While the auditory signal so provided is in the form of voice recorded instructions other auditory signals, not instructions, may be substituted. It has been found highly practical to incorporate a transistorized recording device 27 in the form of a commercially available battery powered, cassette recording unit. Such a unit utilizes insertable, drop-in tape cartridges as at 29, known commercially as cassettes, which have proven particularly convenient in the present apparatus. An earphone 28 for the student is included with the recording unit 27. The self-contained battery power source at 43 of the unit 27 is circuited via a second circuit through a remote, relay operated switch housed within a battery container 30.

The primary electrical circuitry for the present apparatus is housed, to a large extent, in a battery container at 30 secured to the base 1 and having an access plate 31. A 6 volt dry cell battery at 32 (FIG. 10) provides a power source for the present invention with the exception, as aforesaid, of the tape playing device 27. A conductor at 33 connects, through a master control switch 34, one side of the battery to the clip 4 and ultimately the battery plate 6. The contact 11 in the holder 10, upon which the stylus rests, is in circuit with the clip 5 by a wire 35 concealed on the underside of the writing board 2. Hence the stylus 18, when in place in holder 10 or operatively disposed with its end 22 in contact with the metal base 16 of the plate 6, functions to close a circuit back to the opposite pole of the battery 32.

With switch 34 closed and stylus 18 in contact with the metal base 16 of plate 6 (or in holder 10) a circuit is completed via a conductor 36 back to the battery. A relay at 37 is thereby energized to close relay actuated contacts 38–39 in said second circuit which contacts, when closed, interconnect via conductors 40–41 the batteries 43 of the tape device 27 with its electrically powered components. The contacts 38–39 function as a remote control switch for the tape playing device which by reason of its transistor plays instantaneously when the contacts 37 are closed.

The visual signal means comprising light bulb 20 is illuminated simultaneously with the contact of the stylus 18 against metal base 16. A conductor 46, which by-passes relay 37, provides a return to the power source. Accordingly with the student properly guiding the stylus along the grooves 17 the point of the stylus functions to close a circuit to the battery 32 to illuminate light 20 and, by means of a secondary circuit including contacts 38–39, conductors 40–41, energize the tape playing device 27.

In operation the student, upon actuation of OFF-ON switch 34, will hear recorded instructions via earphone 28. The recorded instructions will indicate when the student is to remove the stylus 18 from its holder 10 and begin at the start indices. A normal interval is provided between instructions for accomplishing stylus movement in order that the student may synchronize his efforts with the instructions.

With continued travel of the stylus along the groove 17 the light remains on with the device 27 providing continuous instructions. The student is immediately apprised of tracing errors by the light going off and silence in the earphone 28 until contact between stylus and metal plate 16 is again made.

Further the grooves 17 provide a tactile kinesthetic feedback to the student as improper guidance of the stylus 18 will result in the surfaces defining the grooves offering physical resistance to the stylus.

Indices at 44–45 in the form of colored marks on each plate 6 assist the student in locating starting and ending points in the grooves 17. The recorded instruction also refers to the indices as the student progresses. The final recorded instructions will be for replacement of stylus 18 back into its holder 10 and the actuation of OFF-ON switch 34 to the OFF position.

Having thus described the invention what I desire to secure under a Letters Patent is:

I claim:

1. An apparatus for the teaching of handwriting skills to a student, the apparatus providing visual and aural signals during a writing exercise, the apparatus comprising in combination, a stylus having a conductible point, a metal plate conductor having a superimposed layer of non-conductive material thereon, said non-conductive material having voids therein to define the letters and numerals being learned by the student, said stylus point adapted for guided movement by the student within the voids in contact with the metal plate closing an electrical circuit, aural signal means energized upon the closure of said circuit, said aural means including a recording unit having pre-recorded continuous instructions for playback to the student, the continuous playback of the instructions to the student constituting an aural signal to the student that he is satisfactorily guiding the stylus within said voids, visual signal means carried by said stylus also energized upon the closure of said circuit, and said stylus point and the depth of the voids being such as to require precise muscle control on the student's behalf to guide the stylus point along said voids for the development of handwriting skills.

2. The apparatus as claimed in claim 1 wherein said recording unit includes a self-contained power source in a second electrical circuit, said apparatus further including a relay in the first mentioned electrical circuit energized upon the closing of the circuit, relay actuated switch means in said second circuit operable to open and close said secondary circuit to control operation of the recording unit.

* * * * *